(12) United States Patent
Cierniak et al.

(10) Patent No.: US 7,720,812 B1
(45) Date of Patent: May 18, 2010

(54) SYNCHRONIZING WRITE ACCESSES

(75) Inventors: Michal Cierniak, Campbell, CA (US);
Arnar Mar Hrafnkelsson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1280 days.

(21) Appl. No.: 11/229,190

(22) Filed: Sep. 15, 2005

(51) Int. Cl.
*G06F 7/00* (2006.01)
(52) U.S. Cl. .................. 707/629; 707/648; 707/999.204
(58) Field of Classification Search .................. 707/629, 707/648, 999.204
See application file for complete search history.

(56) References Cited

U.S. PATENT DOCUMENTS

| 5,386,554 | A | | 1/1995 | Nozaki | |
|---|---|---|---|---|---|
| 5,574,899 | A | * | 11/1996 | Kinoshita | 707/1 |
| 5,838,909 | A | * | 11/1998 | Roy et al. | 709/209 |
| 6,189,016 | B1 | * | 2/2001 | Cabrera et al. | 707/203 |
| 6,366,933 | B1 | * | 4/2002 | Ball et al. | 715/203 |
| 6,587,970 | B1 | * | 7/2003 | Wang et al. | 714/47 |
| 7,111,136 | B2 | | 9/2006 | Yamagami | |

* cited by examiner

*Primary Examiner*—Miranda Le
(74) *Attorney, Agent, or Firm*—Sterne, Kessler, Goldstein & Fox PLLC

(57) ABSTRACT

A generational journaling data store can synchronize write accesses so that previous generation masters do not corrupt current generation journals. A master maintains a journal and accesses a data store on behalf of clients. When a master disappears a new master must take its place to ensure reliable and continuous access to the data store. Without generations, a previous master can reappear and corrupt journals and data stores. With generations, a newer generation journal can not be corrupted by a previous generation master.

17 Claims, 4 Drawing Sheets

SYNCHRONIZING WRITE ACCESSES

TECHNICAL FIELD

Embodiments relate to the fields of computing systems, massively parallel computing systems, and compute clusters. Embodiments also relate to avoiding corruption of a journal that journals change to a data store. Embodiments additionally relate to coordinating the ascension of master computers through succeeding generations.

BACKGROUND

Many modern computing environments use an architecture with master computers accessing data stores on behalf of client computers. The reasons for such an architecture include securing access to the data, coordinating access to the data store, and translating client requests into a format that the data store can comprehend.

A data store is a combination of systems and methods for accessing, writing, modifying, and storing data. One example of a data store is a computer running MySQL. Another example of a data store is a web server such as a computer running Apache. A third example of a data store is a computer running a network file system. A fourth example is a computer with a file system.

Some data stores use a technique called journaling. Journaling can help prevent data store corruption. A journal is a history of the changes that are made to a data store. If the data store fails, such as a hard disk crash or a network file system going offline, then the data that should be in the data store can be quickly recovered from the journal and the failed data store. Journaling, journals, and journal files are all known to those practiced in the arts of computer system administration, computer operating systems, computer file systems, and data recovery.

In high reliability environments, a computing system, such as a compute cluster or database distributed through a group of hosts, must be constantly available. Computers, like all equipment, occasionally fail. Highly reliable systems typically use redundant components to ensure that failure of one component does not cause the entire system to fail. For example, a data store can be stored on more than one computer. If one computer fails, others are available to take its place. A client accessing the data store can be unaware of data store hardware failures because the client access succeeds. RAIDs, standing for redundant array of inexpensive disks, are often used in high reliability environments. A RAID appears externally as a single disk drive, but is actually a group of disk drives acting in concert. Certain kinds of RAID can continue operation while a disk drive fails, is removed, and replaced. A journaled data store that is stored on RAID is unlikely to be corrupted.

Some computing environments contain such enormous numbers of computers that failure and data corruption can occur regularly regardless of journaling and redundant data store components. Recall the master computer accessing the data store on behalf of client computers. The master can also maintain a journal for the data store. Computers occasionally fail or otherwise disappear. "Disappear" means the other computers can not communicate with it. When a master disappears, it can be replaced by a new master. In many cases, an inactive master is already prepared and is immediately available. For example, a shadow master continuously attempts to duplicate the internal state of the master and is always prepared to assume the master's responsibilities. A skeleton master, unlike a shadow master, requires some initialization before it can assume the master's responsibilities.

One way to speed the initialization of a new master is for the old master to maintain a checkpoint file. The checkpoint file is essentially a snapshot of the master's internal state. The skeleton master can load the checkpoint file and thereby duplicate that master's state at the time the snapshot was taken.

The problem is that a new master can assume the duties of the master that disappeared, but the old master can reappear. The old master could have been temporarily unavailable because of computer network problems. The old master could have been unresponsive for a number of reasons. Regardless, the old master is back and there are suddenly two master computers trying to maintain the journal. The journal becomes corrupted and then the data store becomes corrupted.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore one aspect of the embodiments to overcome the shortcomings in current technology by providing a current generation master that can access a data store on behalf of a client. The current generation master maintains a current generation journal and has valid state information. Inactive masters, such as shadow masters or skeleton masters are also provided. The current generation has a current generation number that can be used to identify the journal.

Another aspect of the embodiments is to detect the disappearance of the current generation master and to elect a new generation master from among the inactive masters. A new generation number is obtained and the current generation journal is copied to a new generation journal. Generally, the new generation number is larger than the current generation number because, when used to identify journals, a higher number indicates a later generation.

Yet another aspect of the embodiments is that the new generation replaces the current generation and the current generation becomes a previous generation. Once prepared, the new generation master begins accessing the data store on behalf of clients.

An aspect of certain embodiments is for a previous generation master to reappear and discover that a new generation has taken over. The previous generation master can then quit accepting client requests, can then clean up its journal, and can even transform itself into an inactive master.

Another aspect of certain embodiments is to provide a master reference, such as a master file, by which a client can discover the current generation master. The reference can be a name or address stored in a client readable file, data in a database, a link on a web page, or any other kind of reference that can specify the current generation master.

Yet another aspect of certain embodiments is to provide a checkpoint file to help an inactive master more quickly become a current generation master.

A further aspect of certain embodiments is to provide a generation boundary number. An infinite number of generation numbers is not available because computers cannot count to infinity. Eventually, they must "roll over" and begin counting again. A generation boundary number allows the generation numbers to roll over without confusing a newer generation for an older generation.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Overview

A generational journaling data store can synchronize write accesses so that previous generation masters do not corrupt current generation journals. A master maintains a journal and accesses a data store on behalf of clients. When a master disappears a new master must take its place to ensure reliable and continuous access to the data store. Without generations, a previous master can reappear and corrupt journals and data stores. With generations, a newer generation journal can not be corrupted by a previous generation master.

Architectural Overview

Figure 1:
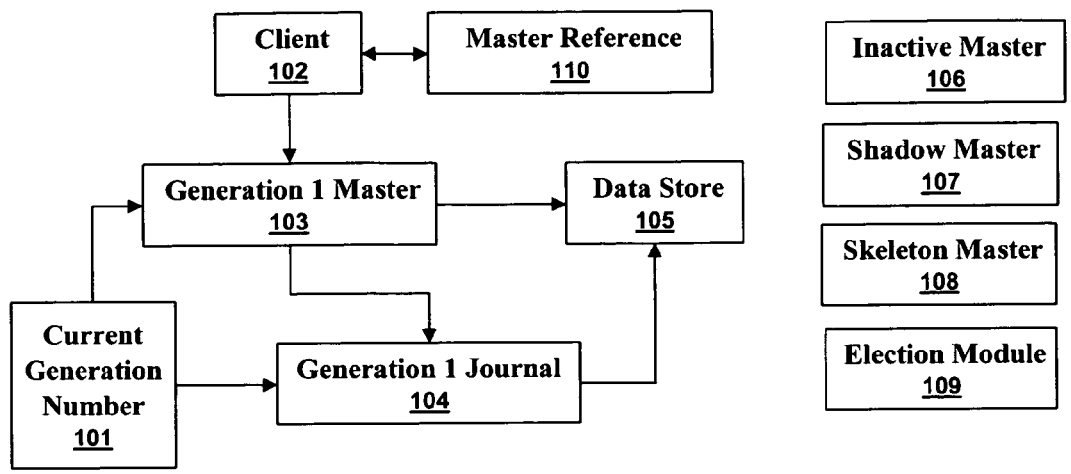
FIG. 1 illustrates a high level block diagram of a system with a generational journaling data store in accordance with aspects of the embodiments.

FIG. 1 illustrates a high level block diagram of a system implementing a generational journaling data store in accordance with aspects of the embodiments. A current generation number 101 identifies the generation of the first generation master 103 and first generation journal 104. A client 102 can access data in the data store 105 by requesting the data from the generation 1 master 103. Here, the client can discover which computer is the current master by querying a master reference 110. In other implementations, there is no master reference and other methods are required to direct clients to the correct master. An election module 109 can choose one of three computers to take over the position of master if the generation 1 master disappears. The three computers are an inactive master 106, a shadow master 107, and a skeleton master 108.

Figure 2:
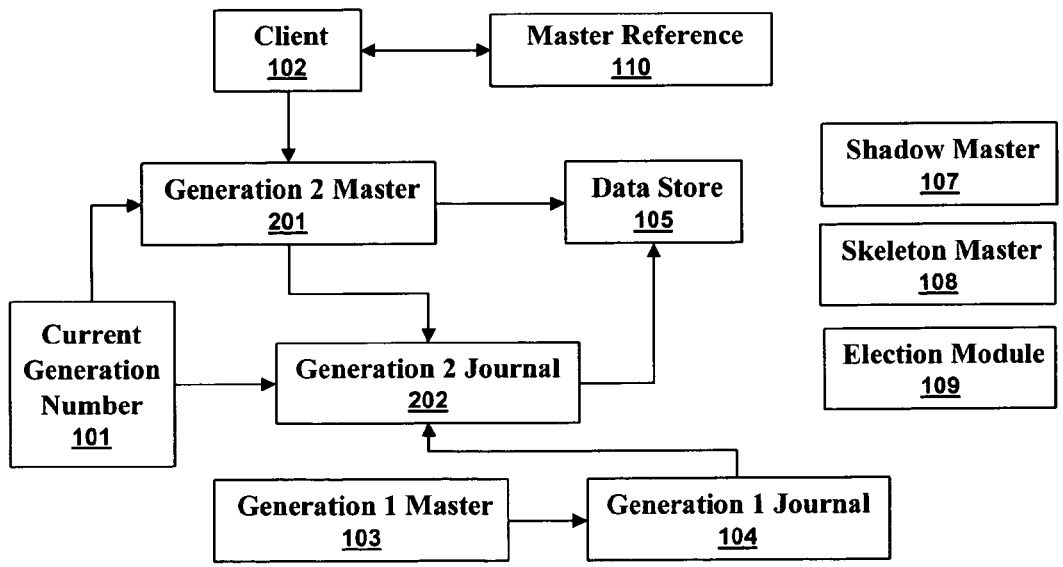
FIG. 2 illustrates a high level block diagram of a system with a generational journaling data store and a previous generation in accordance with aspects of the embodiments.

FIG. 2 illustrates a high level block diagram of a system implementing a generational journaling data store and a previous generation in accordance with aspects of the embodiments. FIG. 2 is intended to illustrate the system of FIG. 1 after a new generation has taken over. The first generation master 103 disappeared. Perhaps it failed, lost communications, or was too busy to respond. When the disappearance was noticed, the election module 109 chose the FIG. 1 inactive master 106 to become the second generation master 201. The first generation journal 104 was copied to the second generation journal 202. Here, the first generation master 103 reappeared and can write to the first generation journal 104 but cannot affect the data store 105.

Figure 3:
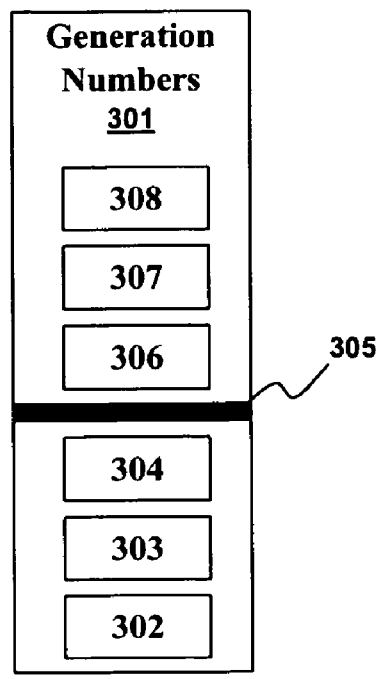
FIG. 3 illustrates generation numbers and a generation boundary number in accordance with aspects of certain embodiments.

FIG. 3 illustrates generation numbers and a generation boundary number 305 in accordance with aspects of certain embodiments. Higher numbers generally indicate a newer generation. 304 is newer than 302. 308 is newer than 306. To prevent rollover, however, an additional rule may be that generation numbers below a generation boundary number are newer than those equal to or above it. As such, generation numbers below the generation boundary number 305 are newer than those equal to or above it. 304 is therefore newer than 306.

Figure 4:
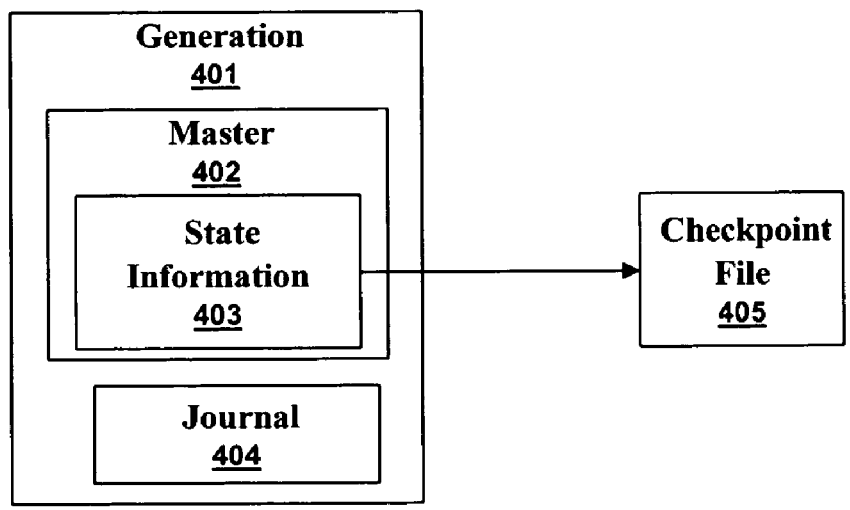
FIG. 4 illustrates a high level block diagram of a generation in accordance with aspects of certain embodiments.

FIG. 4 illustrates a high level block diagram of a generation 401 in accordance with aspects of certain embodiments. Every generation 401 has a master 402 and a journal 404. The master 402 maintains the journal 404 and has state information 403. Those practiced in the arts of computer programming, computer science, or computer engineering are familiar with the concept of process state and state information. The state information 403 can be written to a checkpoint file 405. A new master can load the checkpoint file 405 to quickly reach the process state indicated by the state information 403 that was stored in the checkpoint file 405.

High Level Process Flow

Figure 5:
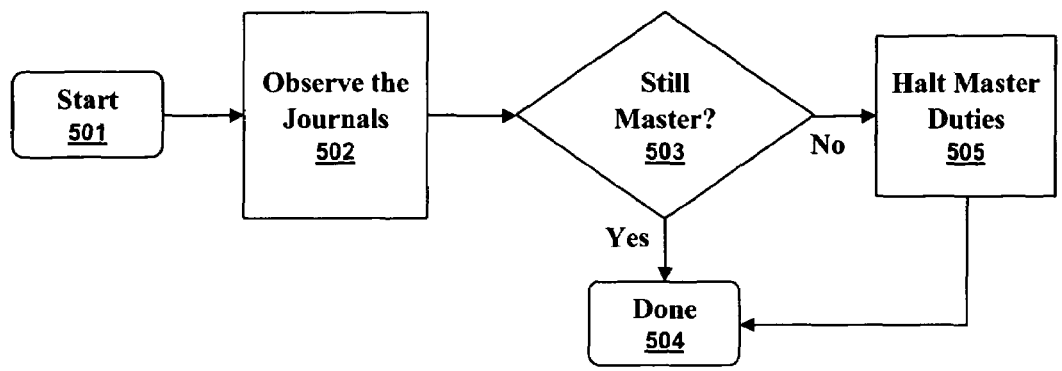
FIG. 5 illustrates a high level flow diagram of a current generation master checking for a newer generation in accordance with aspects of certain embodiments.

FIG. 5 illustrates a high level flow diagram of a current generation master checking for a newer generation in accordance with aspects of certain embodiments. After the start 501 the master observes the journals 502. The journals are maintained by various generation masters accessing a data store. When a new generation is created, a new generation journal file is also created. A master can examine the journal files 502 and determine if a new generation has taken over 503. For example, generation numbers can be part of the journal name where journal017 is newer than journal013. As such, a generation 13 master discovering a generation 17 journal is no longer the current generation master. If a master discovers it is no longer the master, it halts master duties 505 before the process is done 504.

Figure 6:
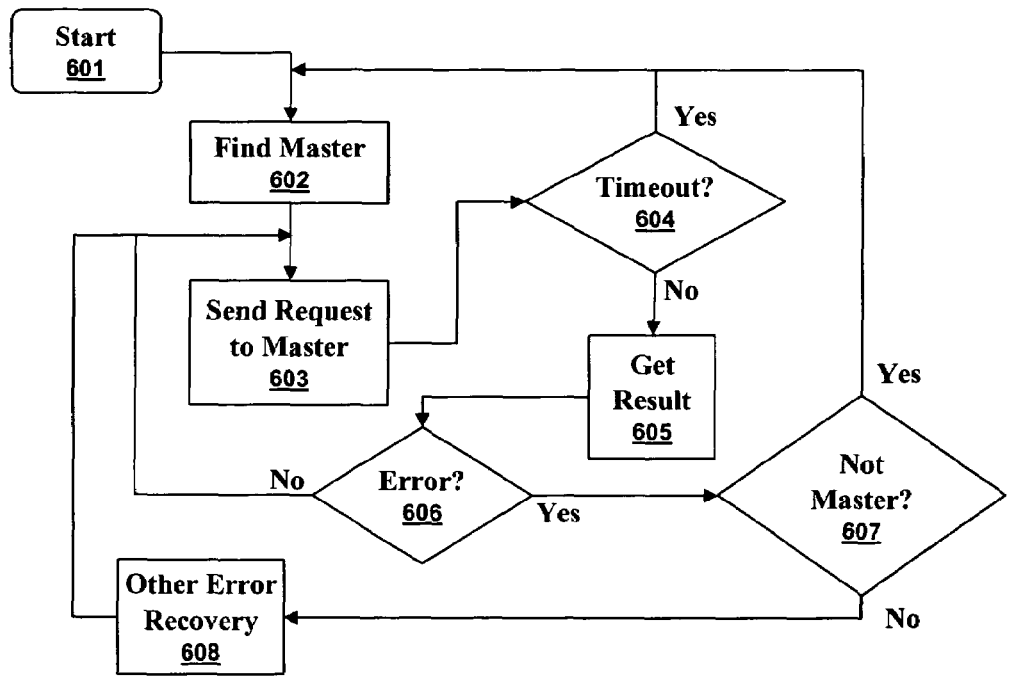
FIG. 6 illustrates a high level flow diagram of client activity in accordance with aspects of certain embodiments.

FIG. 6 illustrates a high level flow diagram of client activity in accordance with aspects of certain embodiments. After the start 601 the client finds the current generation master 602. In some implementations, the master reference is given to the client on startup. In others, the client checks a master reference, such as a master file, to find the master 602. The client then sends a request for data store activity to the master 603 and waits for a response. When the client is done waiting, it checks for a timeout 604 meaning the master never responded. If there was a timeout, the process loops back to finding the master 602. Otherwise, the master has responded and the client has a response 605. If the response is not an error notification 606 the client loops back to sending a request 603. Otherwise, the error is examined. If the error notice indicates that the client made a request of a computer that is not the master 607, then the process loops back to finding the master 602. Otherwise, error recovery 608 occurs and the process loops back to sending a request 603.

Figure 7:
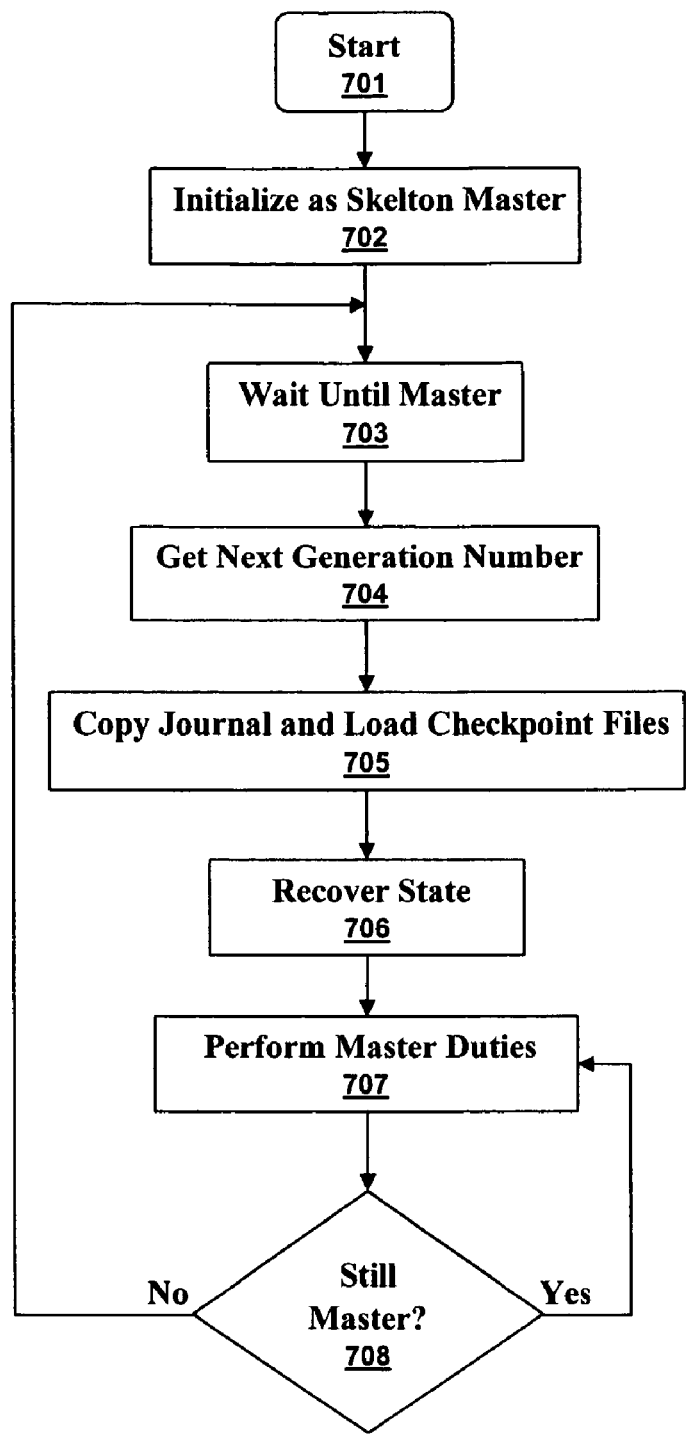
FIG. 7 illustrates a high level flow diagram of the life cycle of a skeleton master in accordance with aspects of certain embodiments.

FIG. 7 illustrates a high level flow diagram of the life cycle of a skeleton master in accordance with aspects of certain embodiments. After the start 701, the skeleton master is initialized 702. It then waits until it is elected master 703 then gets the next generation number 704. The current journal is copied to a new journal and the skeleton loads the checkpoint file 705, if available, and recovers state 706. The skeleton has become the current generation master and proceeds to perform master duties 707 by accessing the data store on behalf of clients. Occasionally, the master checks to see if it is still the master 708. FIG. 5 illustrates how a master can perform this check. If so, it continues performing master duties 707. Otherwise, it can loop back to waiting to become the master 703.

General

Embodiments can be implemented in the context of modules. In the computer programming arts, a module (e.g., a software module) can be implemented as a collection of routines and data structures that perform particular tasks or implement a particular abstract data type. Modules generally can be composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment" or "certain embodiment" do not necessarily refer to the same embodiment, embodiments or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
    a processor;
    a current generation number, at least one current generation journal comprising a history of changes made to at least one data store, and a current generation master comprising valid state information wherein the current generation master performs at least one task for at least one client and wherein performing any one of the at least one task can comprise writing data to the at least one current generation journal or writing data to the at least one data store;
    a master reference such that any one of the at least one client can discover the current generation master;
        at least one inactive master wherein each one of the at least one inactive master is configured to become a new generation master by obtaining a new generation number, setting a generation number of at least one new generation journal to the obtained new generation number, copying the at least one current generation journal to the at least one new generation journal such that the current generation master becomes a previous generation master and the new generation master becomes the current generation master, the new generation number becomes the current generation number, the at least one new generation journal becomes the at least one current generation journal and wherein the previous generation master is configured to discover that it is not the current generation master; and
        an election module configured to cause one of the at least one inactive master to become the new generation master, thereby always having a current generation master and at least one current generation journal such that the at least one data store remains valid,
    wherein at least one of the at least one inactive master is a skeleton master or a shadow master that is configured to become the new generation master before obtaining or producing the valid state information.

2. The system of claim 1 further comprising a master reference such that any one of the at least one client can discover the current generation master.

3. The system of claim 1 further comprising at least one checkpoint file such that the new generation master uses the at least one checkpoint file to more quickly become the current generation master.

4. The system of claim 1 wherein at least one of the at least one inactive master is a skeleton master wherein the skeleton master must become the new generation master before obtaining or producing the valid state information.

5. The system of claim 1 wherein at least one of the at least one inactive master is a shadow master wherein the shadow master is configured to obtain or produce the valid state information before becoming the new generation master.

6. The system of claim 1 further comprising a generation boundary number wherein any generation number below the generation boundary number is newer than any generation number equal to or higher than the generation boundary number.

7. A computer-implemented method comprising:
    (a) choosing at least one inactive master to become a new generation master upon detecting an absence of a current generation master comprising valid state information, wherein at least one of the at least one inactive master is a skeleton master or a shadow master that must become the new generation master before obtaining or producing the valid state information;
    (b) initializing the new generation master wherein initializing comprises getting a new generation number, setting a generation number of a new generation journal to be the new generation number, copying at least one current generation journal comprising a history of changes to a data store to the new generation journal, setting the new generation number as the current generation number, and setting the new generation master to be the current generation master; and
    (c) detecting, by a previous generation master, an existence of the current generation master such that the previous generation master stops performing client tasks on behalf of one or more clients, wherein the current generation master is found by reading a current generation master reference,
    wherein at least one of steps (a), (b) and (c) is implemented with one or more processors.

8. The computer-implemented method of claim 7 further comprising transforming the previous generation master into one of the at least one inactive master.

9. The computer-implemented method of claim 7 wherein at least one of the at least one inactive master is a skeleton master wherein the skeleton master must become the new generation master before obtaining or producing the valid state information.

10. The computer-implemented method of claim 7 wherein at least one of the at least one inactive master is a shadow master, the shadow master obtaining or producing the valid state information before becoming the new generation master.

11. The computer-implemented method of claim 7 further comprising:
- a requester sending a task request to a known master wherein the requestor is one of the at least one client;
- waiting, by the requestor, for at least one of a timeout, a wrong master error response, or other response wherein the timeout and the wrong master error response both lead to finding the current generation master; and
- setting the current generation master to be the known master.

12. The computer-implemented method of claim 11 wherein the current generation master is found by querying a server.

13. The computer-implemented method of claim 7 further comprising maintaining a generation boundary number wherein any generation number below the generation boundary number is newer than any generation number equal to or higher than the generation boundary number.

14. A system comprising:
- a means for tracking at least one generation wherein each generation comprises a master and a journal including a history of changes made to a data store and wherein the at least one generation comprises zero or more previous generations and a current generation;
- a means for maintaining a current generation master state information;
- a means for receiving client requests for the current generation master to perform at least one task each comprising writing data to a data store or to the current generation journal;
- a means for performing at least one task with the current generation master, wherein the current generation master is found by reading a current generation master reference;
- a means for initializing new generations wherein a new generation journal is created from the current generation journal and wherein a new generation active master is created or selected from a skeleton master or a shadow master that must become the new generation active master before obtaining or producing valid state information;
- a means for updating generations wherein the current generation becomes one of the zero or more previous generations and the new generation becomes the current generation; and
- a means for detecting when a new generation is needed.

15. The system of claim 14 further comprising a means for the client to detect that generations have been updated and a means for the client to discover the current generation master.

16. The system of claim 14 further comprising a means for a previous generation master to detect that generations have been updated and a means for the previous generation master to stop being a master.

17. The system of claim 14 further comprising a means for the new generation master to quickly obtain the current generation master state information.

\* \* \* \* \*